(12) United States Patent
Hogan

(10) Patent No.: US 6,738,753 B1
(45) Date of Patent: May 18, 2004

(54) MODULAR, HIERARCHICALLY ORGANIZED ARTIFICIAL INTELLIGENCE ENTITY

(76) Inventor: Michael Andrew Hogan, 545 E. St. John St., San Jose, CA (US) 95112

( * ) Notice: Subject to any disclaimer, the term of this patent is extended or adjusted under 35 U.S.C. 154(b) by 350 days.

(21) Appl. No.: 09/642,356

(22) Filed: Aug. 21, 2000

(51) Int. Cl.[7] .............................................. G06F 15/18
(52) U.S. Cl. ......................................... 706/12; 706/13
(58) Field of Search ............................ 706/48, 47, 12, 706/13, 15, 16, 25, 26, 27

(56) References Cited

U.S. PATENT DOCUMENTS

| | | | | |
|---|---|---|---|---|
| 5,367,449 A | * | 11/1994 | Manthey | 700/32 |
| 5,946,673 A | * | 8/1999 | Francone et al. | 706/13 |
| 6,064,971 A | * | 5/2000 | Hartnett | 706/46 |
| 6,098,059 A | * | 8/2000 | Nordin | 706/13 |
| 6,144,989 A | * | 11/2000 | Hodjat et al. | 709/202 |
| 6,473,851 B1 | * | 10/2002 | Plutowski | 713/1 |
| 6,493,686 B1 | * | 12/2002 | Francone et al. | 706/12 |

OTHER PUBLICATIONS

Peelle, H., "Teaching a Topic in Psychology with APL: A Cognitive Information Processing Model", Proceedings of the International Conference on APL, 1982, pp. 246–248.*

Ruebenstrunk, G., "Emotional Computers: Computer Models of Emotions and Their Meaning for Emotion–Psychological Research", Nov. 1998, Retreived from the Internet: http://www.ruebenstrunk.de/emeocomp/content.H.*

Minsky, M., "Steps Toward Artificial Intelligence", Oct. 1960, Retrieved from the Internet: http://web.media.mit-.edu/~ minsky/papers/steps.h.*

Lamma et al., Learning in a Three–Valued Setting, Compulog–Net and Machine Learning–Net Workshop at JICSLP, 1988, p. 63–69.*

(List continued on next page.)

*Primary Examiner*—Wilbert L. Starks, Jr.
*Assistant Examiner*—Kelvin Booker

(57) ABSTRACT

A modular artificial intelligence learning entity (a "golem") which is replicated many times to form a super-entity that shows intelligent behavior transcending that of its individual constituents. Within the group of golems, individual golems may occupy roles, and are role differentiated, in that structurally identical entities perform different functions and exhibit different behavior depending on their personas and the learning they have completed as driven by other entities. The group of golems is hierarchically organized, in the sense that 'superior' entities issue policies to 'subordinate' entities. In addition to responding to 'sense' input from its environment, the golem responds to policy requirements set by other entities, including its superiors, and in turn sets policy requirements for its subordinates. Actions of the golem are measured for successful compliance with that golem's policies by its superior, who directs the golem's learning process. The super-entity thus gains intelligence through the policy reinforcement occurring in each superior-subordinate relationship. This scheme is well adapted to working over a network with logically separated but communicating golems. Its flexibility allows its application both to single complex problems and to repetitively occurring simple problems. Opportunities for its use arise in operating environments, in simulation and gaming, and in research.

16 Claims, 12 Drawing Sheets

OTHER PUBLICATIONS

Quinlan et al., Induction of Logic Programs: FOIL and Related Systems, New Generation Computing, 1995, Vol 13, No 3 & 4, pp. 287–312.*

Califf et al., Relational Learning of Pattern–Match Rules for Information Extraction, Working Notes of AAAI Spring Symposium o Applying Machine Learning to Discourse Processing, 1998, pp. 6–10.*

Muggleton et al., Efficient Induction of Logic Programs, Proceedings of the 1st Conference on Algorithmic Learning Theory, 1990, pp. 368–381.*

Muggleton, S., Scientific Knowledge Discovery Using Inductive Logic Programming, Communications of the ACM, Nov. 1999, Vol 42, Iss 11, pp. 42–46.*

Muggleton, S., Bayesian Inductive Logic Programming, Proceedings of the 7th Annual Conference on Computational Learning Theory, 1994, pp. 3–11.*

Dzeroski et al., PAC–Learnability of Determinate Logic Programs, Proceedings of the 5th Annual Workshop on Computational Learning Theory, 1992, pp. 128–135.*

Bratko et al., Applications of Inductive Logic Programming, Communications of the ACM, Nov. 1995, Vol 38, No 11, p. 65–70.*

King et al., Drug Design Using Inductive Logic Programming, Proceedings of the 26th Hawaii International Conference on System Sciences, Jan. 1993, Vol 1, pp. 646–655.*

Muggleton et al., Using Logic for Protein Structure Prediction, Proceedings of the 25th Hawaii International Conference on System Sciences, Jan. 1992, Vol 1, pp. 685–696.*

* cited by examiner

| Action type matrix 285 for "throw the ball" | | |
|---|---|---|
| | Policies | |
| | Choke off run | Get double play |
| Policy selected? | Y | N |
| S1 Ball goes to base where runner is approaching | 5 | 5 |
| S2 Chance at double play | 0 | 10 |
| S3 Chance to prevent run | 10 | 0 |
| S4 Other statement | 2 | -1 |

Fig. 11(A)

| Contingent sense statement values for candidate actions 120 | | | | |
|---|---|---|---|---|
| | Contingent stmt values | | | |
| Stmt | Throw to 1st | Throw to 2nd | Throw to 3rd | Throw to Home |
| S1 Ball goes to base where runner is approaching | 1 | 1 | 0 | 1 |
| S2 Chance at double play | 0 | 1 | 0 | 0 |
| S3 Chance to prevent run | 0 | 0 | 0 | 1 |
| S4 Other statement | 0.1 | -0.5 | -1 | -0.5 |

Fig. 11(B)

| Scoring of candidate actions 120 | | | | | | | |
|---|---|---|---|---|---|---|---|
| Votes (Choke) | | | | Votes (Double) | | | |
| Throw to $1^{st}$ | Throw to $2^{nd}$ | Throw to $3^{rd}$ | Throw Home | Throw to $1^{st}$ | Throw to $2^{nd}$ | Throw to $3^{rd}$ | Throw Home |
| 5 | 5 | 0 | 5 | 5 | 5 | 0 | 5 |
| 0 | 0 | 0 | 0 | 0 | 10 | 0 | 0 |
| 0 | 0 | 0 | 10 | 0 | 0 | 0 | 0 |
| 0.2 | -1 | -2 | -1 | -0.1 | 0.5 | 1 | 0.5 |
| Scores 5.2 | 4 | -2 | 14 | 4.9 | 15.5 | 1 | 5.5 |

Fig. 11(C)

| Journal 400 after choosing actions | | | | |
|---|---|---|---|---|
| Policy | Action: throw to | Stmt | Vote | Chosen |
| Choke | First | S1 | 5 | N |
| Choke | First | S2 | 0 | N |
| Choke | First | S3 | 0 | N |
| Choke | First | S4 | 0.2 | N |
| Choke | Second | S1 | 5 | N |
| Choke | Second | S2 | 0 | N |
| Choke | Second | S3 | 0 | N |
| Choke | Second | S4 | -2 | N |
| Choke | Third | S1 | 0 | N |
| Choke | Third | S2 | 0 | N |
| Choke | Third | S3 | 0 | N |
| Choke | Third | S4 | -2 | N |
| Choke | Home | S1 | 5 | Y |
| Choke | Home | S2 | 0 | Y |
| Choke | Home | S3 | 10 | Y |
| Choke | Home | S4 | -1 | Y |
| Double | First | S1 | 5 | N |
| Double | First | S2 | 0 | N |
| Double | First | S3 | 0 | N |
| Double | First | S4 | -0.1 | N |
| Double | Second | S1 | 5 | N |
| Double | Second | S2 | 10 | N |
| Double | Second | S3 | 0 | N |
| Double | Second | S4 | 0.5 | N |
| Double | Third | S1 | 0 | N |
| Double | Third | S2 | 0 | N |
| Double | Third | S3 | 0 | N |
| Double | Third | S4 | 1 | N |
| Double | Home | S1 | 5 | Y |
| Double | Home | S2 | 0 | Y |
| Double | Home | S3 | 0 | Y |
| Double | Home | S4 | 0.5 | Y |

Fig. 11(D)

MODULAR, HIERARCHICALLY ORGANIZED ARTIFICIAL INTELLIGENCE ENTITY

CROSS-REFERENCE TO RELATED APPLICATIONS

Not applicable.

STATEMENT REGARDING FEDERALLY SPONSORED RESEARCH AND DEVELOPMENT

Not applicable.

REFERENCE TO MICROFICHE APPENDIX

Not applicable.

BACKGROUND—FIELD OF INVENTION

This invention relates to artificial intelligence systems and more particularly to the organization and structure of a plurality of learning artificial intelligence entities.

BACKGROUND—DESCRIPTION OF PRIOR ART

For purposes of this document, we consider an artificially intelligent (AI) entity as having three defining properties. Two are conventional within the AI discipline; the third is sometimes used and sometimes omitted, depending on the emphasis of the AI effort.

First, an AI entity exhibits complex behavior that affects the world external to itself. It may send control information to electronic or mechanical devices; it may output information to human beings; it may directly alter some property of its environment. Second, an AI entity responds to information about its environment. Its 'senses' may be electronic readings, digitally coded information, physical movement or any other method of bringing information from outside. In general usage, 'complex' behavior means 'non-obvious' behavior. For example, a simple controller like the governor on a steam engine would not usually be considered artificially intelligent since the source of its response to sensed engine speed is apparent to observation.

AI devices with these two properties exhibit complex behavior in an unchanging way. Examples in widespread current use would be (1) 'expert systems', where a set of facts and rules is input to an execution device which will then, in the absence of new inputs, give the same answers to the same questions, (2) stock charting systems, where the rules for choosing investments, once defined, make the same recommendations whenever the same patterns appear, and (3) 'multi-agent systems,' AI applications in resource allocation where the 'agents' are executing fixed algorithms and are given a language or protocol in which to communicate and negotiate with each other.

The third property in the present definition is that the AI entity changes its behavior as a result of experience. That is, the same situation will evoke a different response from the AI entity if the entity has 'seen it' before. We say that such an entity is a 'learning AI entity'.

To summarize, an AI entity accepts sense data from its environment, produces complex behavior in response, and as the definition is used here learns from experience.

Current AI in the non-learning sense includes knowledge bases and multi-agent processing schemes. Knowledge bases are organized around collections of information with rules for making inferences and answering queries. Multi-agent schemes combine numerous entities operating on fixed algorithms. Often these aggregations include convenient methods for people to update the algorithms, inference rules and other recipes that govern their behavior. However, the 'learning' is actually happening in their human keepers, but not on the aggregation itself.

Current AI learning technology consists largely of refinements of two basic models developed in the 1960s, as described in the next section.

The Bases of Computer Artificial Intelligence

Single Entity and Scoring Polynomial (Newell, Samuel)

The 1958 paper by Newell, Shaw and Simon[i] and the 1959 paper by Samuel[ii] laid the groundwork for the single AI entity using the scoring polynomial approach. In Newell, et al., a chess-playing automaton is described. Samuel's version played checkers. In both cases the 'senses' consisted of various measures of game positions. In chess, measures like point values of pieces for each side, occupancy of key center squares, control of long files, etc., were used. A move generator created a list of possible chains of moves and countermoves, ending in a list of accessible future positions. Each position had its sense values, and the imputed value of each position was the sum of each sense value multiplied by a factor specific to that sense. Learning, a major factor in the Samuel paper, involved adjusting the factors applied to each sense by applying feedback from positions actually attained.

[i] Newell, A., J. C. Shaw, and H. A. Simon. 1958. Chess-Playing Programs and the Problem of Complexity. IBM J. Res. Develop. 2:320–25.

[ii] Samuel, A. L. 1959. Some Studies in Machine Learning Using the Game of Checkers. IBM J. Res. Develop. Pp. 210–229.

The defining characteristics of this model, then, are (1) the single entity using a defined set of senses and a scoring polynomial, and (2) reinforcement by adjustment of the sense factors in the polynomial.

Neural Net (Rosenblatt)

The Rosenblatt[iii] model, named the Perceptron, attempted to mimic the action of neurons in animals. It was used in a simple character-recognition activity. A large number of identical cell-like entities, each exhibiting simple behavior, were connected, each to all others. Senses were applied to some cells, which propagated simple on-off pulses to other connected cells. Reinforcement was applied to other cells, which also sent on-off pulses to their connected neighbor cells. Cells receiving pulses would transmit pulses to their own connected neighbors if their total receipts exceeded a threshold value unique to that cell. Learning consisted of adjusting the individual cells' thresholds based on reinforcement pulses received.

[iii] Rosenblatt, F. 1958. The Perceptron: A Probabilistic Model for Information Storage and Organization in the Brain, Cornell Aeronautical Laboratory, Psychological Review, v.65, No. 6, p. 386–408.

The defining characteristics of the Rosenblatt model, then, are (1) a large number of simple threshold-type cells working with on-off pulses, (2) initial connection of cells to neighbors, and (3) learning by adjustment of thresholds.

Current art encompasses the Newell/Samuel models of single AI entities, which are able to sense environmental input, exhibit complex behavior, and learn through use of various scoring methods. The single-entity scoring polynomial is used in such areas as scoring of loan applications, although in practice the learning process is 'frozen' to prevent unpredictable behavior in a business environment. There is also a great deal of current art based on the Rosenblatt neural net model. Neural net models based on the original Perceptron actually learn in operation in, for example, stock-picking applications. While they have grown in complexity by 'layering', connecting multiple 'simple'

Rosenblatt assemblages, they are still based on the relay-line threshold-activated undifferentiated cell.

There have been no combinations of the single complex learning (Newell) entity into complex assemblages including role differentiation and internally driven learning. However, such an AI super-entity constructed of an arrangement of modular learning AI entities, role differentiated and hierarchically organized, and motivated by policies set for subordinates by their superiors, would more accurately model such super-intelligent entities as communities, teams, societies, or corporations.

Accordingly, there is a need in the art for a form of AI entity that combines the cooperative aspects of the simple Rosenblatt model with the more sophisticated individual behavior of the Newell-Samuel model, adding to standard modular form the new elements of role differentiation and variation of behavior as a result of experience—both the direct experience of the entity and that of other entities.

Further, there is a need in the art for a mode of integration of AI entities of this type with other entities, including human beings, in a cooperative network using the same communication structures interchangeably.

Further, there is a need in the art for the learning behavior of the super-entity created by linking numerous AI entities, and the application of this super-entity to complex problems and to simulation of actual multi-entity situations.

SUMMARY OF THE INVENTION

The invention is an artificial intelligence entity incorporating a structure not seen in prior art. Specifically, the AI learning entity is modular, so that a single entity is replicated many times to form a super-entity that shows intelligent behavior transcending that of its individual constituents. We refer to the modular AI learning entity as a golem[iv] (20). It is role differentiated, in that structurally identical entities perform different functions and exhibit different behavior depending on their personas[v] and the learning they have completed as driven by other entities. Further, the group of golems is hierarchically organized, in the sense that 'superior' entities issue policies to 'subordinate' entities. The golem responds to 'sense' input from its environment as well as to policy requirements set by other entities.

[iv] Golem: In Jewish legend, a human being made of clay and given life by supernatural means. Hence, a robot or automaton.
[v] Persona: The mask worn by a player in ancient Greek comedy and drama. Hence, the set of characteristics associated with a role.

The hierarchical organization of golems in this invention differs from other hierarchical organization schemes. In some such schemes the hierarchically organized entities are not learning entities but obtain changes to their evaluation mechanisms from human input. In other cases, the learning mechanism is artificially restricted and lacks the golem-teach-golem reinforcement mechanism of the present invention. An example of the latter is U.S. Pat. No. 5,367,449 to Manthey on Nov. 22, 1994. In the Manthey patent, a single artificial intelligence system employed a hierarchical scheme of identical AI entities working against discontinuous external inputs (ie, inputs limited to a fixed set of values rather than the continuous variables in the present invention). Further, the inputs were required to be independent and uncorrelated, a requirement not part of the present invention and difficult to meet in many real situations. No variation in persona (i.e., entity capabilities or role differentiation) was included. In contrast, the artificial intelligence entity described here incorporates hierarchical organization of a plurality of golems differentiated in role and potentially in type (i.e., including humans and other AI entities) within a super-entity.

We use several terms to describe how the golems, through differences in persona and hierarchical arrangement, derive individualized behavior despite underlying structural sameness. The "role" of a golem is defined by the collection of policies and action types available to it; thus two golems may have identical roles, or may be role differentiated by different policy sets or available action types.

We define a golem's persona more broadly, as the list of sense statements, actions, and policies it can understand and a corresponding set of weights for turning these lists into rankings of actions which it might choose to take. Thus two golems who share a role can have either identical, or different, personas. We can characterize a golem's persona as its individualized representation of the role it may share with others. Further, it is through changes to its persona, both self-initiated and initiated by actions of a golem's superior(s), that a golem implements learning.

In this model the golem can perform actions under its own control—either direct actions upon its environment or policy actions to its subordinate entities. In contrast with non-learning artificial intelligence, each golem independently learns by using success-failure information, defined in terms of the policies in effect, to modify its future behavior, specifically by modifying its evaluation of alternative actions. Each golem is also presented with a random influx of new, untried sense statements and policies for its use in evaluating and learning. In this hierarchical model, a golem's success is measured in terms of policies set by its superior, so that overall there is a policy reinforcement loop among entities and role differentiation is supported.

OBJECTS AND ADVANTAGES

The golem which is the subject of this invention offers an effective method of multiplying the learning capability of simple AI entities through hierarchical organization and reinforcement. It also allows decentralization of an AI process without loss of linked learning capability. This is particularly useful given the current growth in feasibility of networked information structures. Hence, the golem is a useful artificial intelligence tool and thus brings added utility to any context where artificial intelligence is currently applied. Additionally, the golem has significant potential for use as a modeling tool; for example, an AI super-entity constructed of an arrangement of golems, role differentiated and hierarchically organized, and motivated by policies set for subordinates by their superiors, more accurately models real-world super-intelligent entities (e.g., communities, teams, societies, or corporations).

The golem is novel in the current and prior art in that it offers a mode of learning and reinforcement in hierarchical structures without constraints on externally derived inputs (senses) such as that they be mutually exclusive or limited to discontinuous values. It also offers a novel method of reinforcement of AI entities by other AI entities using its hierarchical scheme.

It is helpful to have a concrete example in explaining the invention. The following discussion is directed to a computer apparatus that is able to accept computer-readable data input, store computer-readable data, manipulate computer-readable data, and communicate computer-readable data output; in short, a computer platform onto which the scheme of golems can be encoded.

Modular AI Entity

The invention consists of a modular AI learning entity, which we refer to as a golem (20). A single golem is replicated many times to form a super-entity that shows intelligent behavior transcending that of its individual constituents. Within the group of golems, individual golems occupy roles. One golem may 'command' several other entities. Not all roles need to be occupied by the golems described here; roles can also be taken by other kinds of AI entities or by human beings, using an interface (such interface fulfilling the function whereby each of said foreign artificially-intelligent entities and human beings can interface with the modular artificial intelligence learning entities).

Hierarchically Organized

The group of entities is hierarchically organized, in the sense that 'superior' entities issue policies to 'subordinate' entities. However, the hierarchy need not be a simple 'tree' hierarchy; more complex arrangements are possible.

Golem Responds to External "Sense"

Like all AI entities, the golem described here responds to external senses. An example: The golem occupies the role of second baseman in a baseball game. Sense data is: There are men on first and third, the ball is hit to me Golem Responds to "Policy" Inputs from Other AI Entities In addition to sense data from the external world, the golem described here responds to policy requirements set by superior entities. In the baseball example, the second baseman's superior entity (manager) could have said 'Choke off run' or 'Try for the double play'. Which policy was in effect would partially determine the second baseman's action.

Golem Performs Actions

Actions taken by a golem can be either "direct actions," which have an effect on the golem's persona or on the external environment, or "policy actions," directed toward the golem's subordinates.

Golem Performs Direct Actions

In this model the golem can perform actions under its own control. It does this either directly or by issuing commands to a non-intelligent device. In the baseball example, the second baseman has some action options: Throw to home, throw to first, throw to third, throw to home, do nothing. The results of direct actions are reflected in the environment, where they can be sensed.

Golem Performs Policy Actions

The golem may also perform policy actions, either by issuing policies to its subordinate entities if it has any, or by directing the reinforcement of successful decision making by its subordinates.

The policies issued by the golem to its subordinates would be determined by the senses available to the issuing golem. In the baseball example the second baseman has no subordinates. The manager has subordinates. Prior to the pitch, the manager might issue 'choke off the run' (say, the team trails by one run in the bottom of the ninth inning). Alternatively, the manager might issue 'go for the double play' (say, the team leads by three in the top of the fifth).

Golem Learns from Success and Failure

The golem performs its own actions and issues policy orders to subordinates in keeping with its own policy orders (received from a superior) and its sense impressions. The intent of these actions is to execute those policies successfully. In the baseball example, the second baseman's action under the 'choke off the run' policy is successful if no run scores. Under 'get the double play' it is successful if the double play comes off.

Learning, for the golem, then consists of using success-failure information, defined in terms of the policies in effect, to modify the golem's future behavior. It does this by modifying the golem's evaluation of alternative actions.

Golem is Role Differentiated

The golem's role consists of its full set of policies and action types, which it shares with all other golems fulfilling the same role. Golems with access to differing policies or action types are thereby role-differentiated. A golem, moreover, executes its role by considering the sense statements available to it and evaluating which actions to take through use of its own set of weights. This combination of its role together with its defined sense statements and set of weights constitutes the golem's persona, and it is the persona that allows the golem to act differently than may other golems in the same role. Thus the super-entity, through the hierarchically organized golems, supports both role differentiation and individualized behavior within roles.

Further objects and advantages of the invention will become apparent from a consideration of the drawings and ensuing description.

DRAWING FIGURES

Brief Description of the Drawings

A more complete understanding of the present invention may be attained by referring to the detailed description and claims when considered in connection with the accompanying drawings in which like reference numbers indicate like features wherein:

FIGS. 11(A–D) is a set of charts illustrating the action of the evaluation process in the case of a second baseman.

REFERENCE NUMERALS IN DRAWINGS

Figure 1:
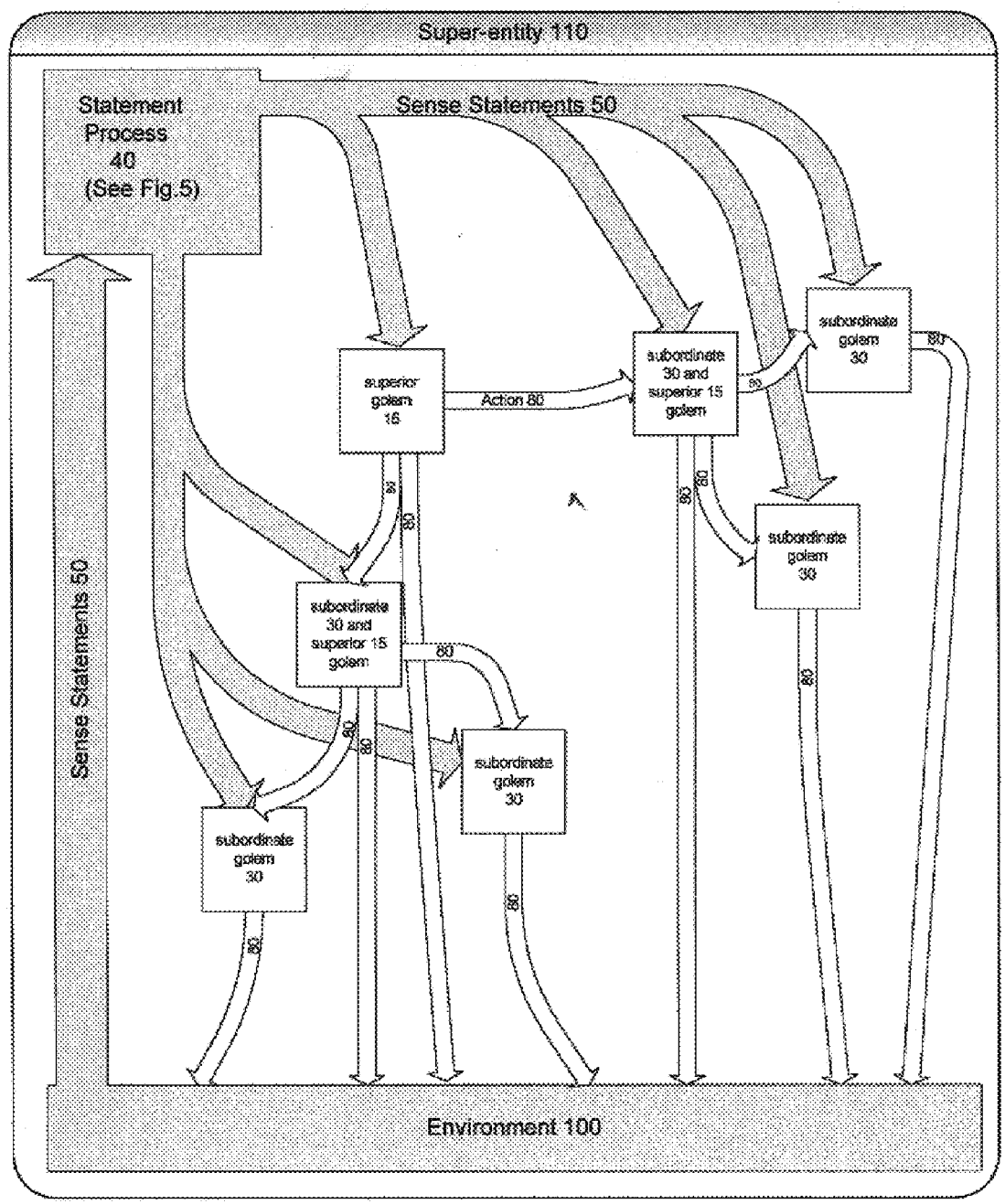
FIG. 1 shows the super-entity of hierarchically organized golems as a block diagram, wherein the golems are related in superior/subordinate relationships, and each golem is structurally identical, receiving sense and policy input and acting directly on the environment as well as by issuing policies to its subordinate(s).

15 superior golem
20 golem
30 subordinate golem
40 statement process
50 sense statement 51 simple sense statement
52 complex sense statement
54 constant
55 sense
65 policy action
66 policy
70 direct action
80 action
95 evaluation grid
100 environment
110 super-entity
120 candidate action
140 policy type
150 action type
160 exclusivity group
180 score
190 vote
210 success criterion
220 matrix reinforcement
230 reinforcement policy action
235 directive policy action
245 persona
250 persona set
255 persona matrix
260 role
265 weight
270 sense statement axis
275 policy axis
280 action type axis
285 action type grid
290 action type object
295 sense value
296 sense statement value
305 set reinforcement
310 results
315 contingent sense statement
330 report card
400 journal

DESCRIPTION OF THE INVENTION

FIGS. 1–3, 4(A—C), 5(A–B), and 6—Structure of the Preferred Embodiment

FIG. 1: Super-entity of hierarchically organized learning golems

FIG. 1 is a block diagram showing the structure of a super-entity 110, a collection of entities linked by superior-subordinate relationships. Entities in the diagram include a plurality of superior golems 15 and subordinate golems 30, as well as a plurality of entities labeled both subordinate golem 30 and superior golem 15. Each of these entities is also, more generally, a golem (20, in FIG. 3). Golem 20 is an AI structure which is the subject of this invention, and superior golem 15 is golem 20 which sets policy for some other golem 20. Likewise, golem 20 for which some other golem 20 sets policy is subordinate golem 30.

It is important to note that an entity, whether or not it enjoys a superior or subordinate relationship with another entity, need not be golem 20. In fact, superior golem 30 may set policy for a subordinate entity which is not golem 20, and this drawing should be not be construed as excluding this sort of relationship. Super-entity 110 can include non-golem entities, such as foreign AI entities and human beings. As mentioned above, these non-golem entities may also, but need not, be related to some or any golem 20 as a superior or subordinate entity. The construction of this super-entity using both standard modular AI entities (golems) and optionally other entities including people is an important part of the invention.

The ability to designate golem 20 as superior golem 30 or subordinate golem 15 fulfills the function of hierarchically arranging the modular artificial intelligence learning entities into superior-subordinate relationships within super-entity 110. This ability, combined with the inclusion of foreign entities in super-entity 110, further fulfills the function of defining the artificially intelligent entity as superior to subordinate entities selected from the group consisting of foreign artificially intelligent entities, foreign non-intelligent entities, human beings, and other instances of the individual artificially intelligent entity.

FIG. 1 also depicts the inputs and outputs of the plurality of golems 20. Sense statements 50 exist in an environment 100 as basic input variables with scalar values. After filtering sense statements 50 through a statement process 40 (described in FIG. 2), golem 20 obtains sense statements 50 which it can recognize as input. Subordinate golem 30 receives the additional input of action(s) 80 upon it by its superior golem(s) 15. In turn, each golem 20, whether subordinate golem 30 or superior golem 15, or both, outputs actions 80, either directly upon environment 100, to one or a plurality of the golem's subordinate golems 30, or both.

In the preferred embodiment, the organization of golems 20 is encoded upon a computer platform, of which any appropriate type may be used. The computer platform is not shown in the drawings and may have any appropriate configuration, so long as it includes a computer apparatus that is able to accept computer-readable data input, store computer-readable data, manipulate computer-readable data, and communicate computer-readable data output.

Figure 2:
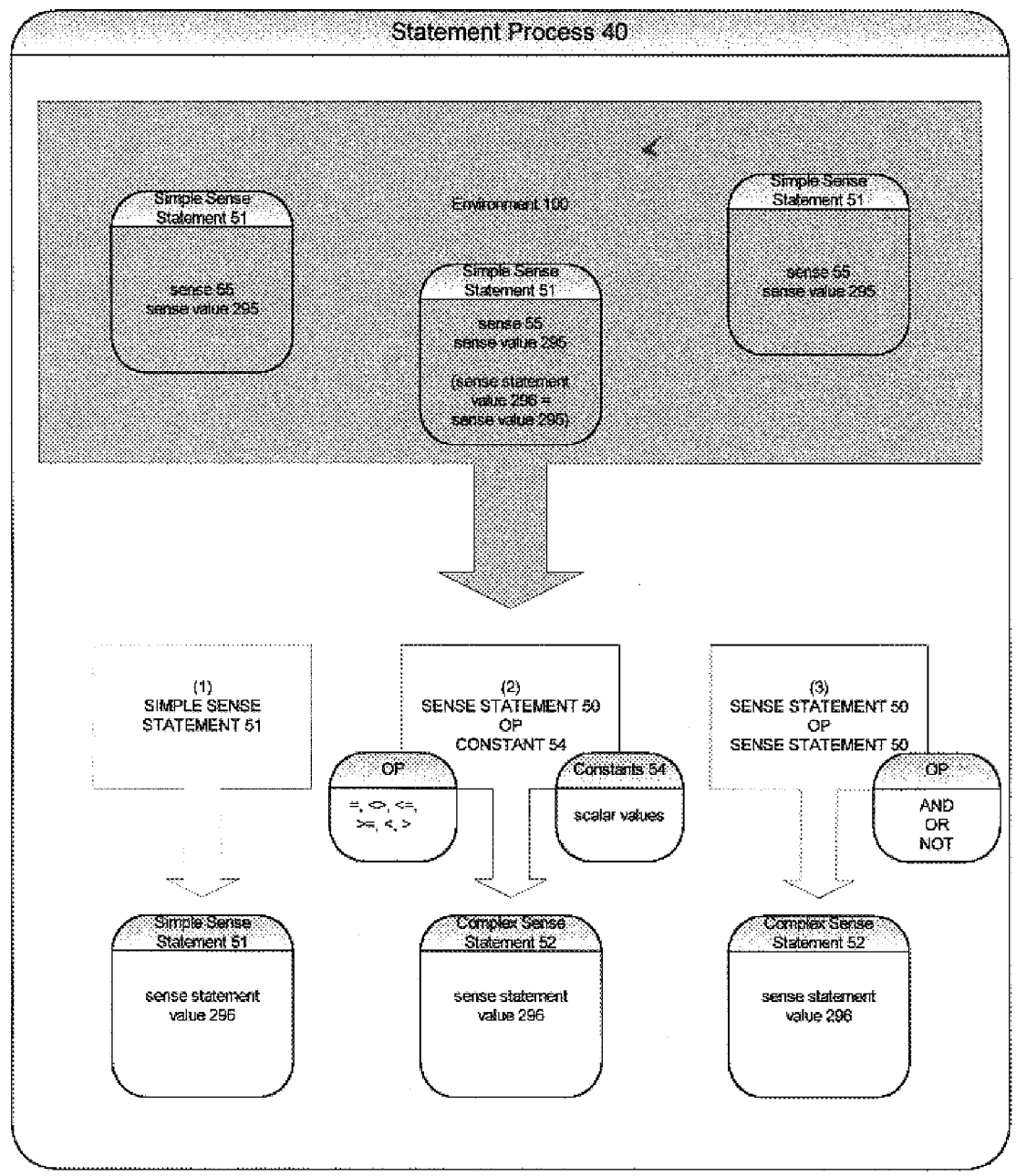
FIG. 2 shows the structural elements of the sense statement process.

FIG. 2: Statement Process 40

FIG. 2 is a block diagram showing the structure of sense statements 50 and how sense statements 50 are related through statement process 40. As described below, statement process 40 fulfills the functions of (1) accepting sense data, (2) organizing senses into sense statements, (3) building complex statements from combinations of said sense statements, and (4) generating additional complex statements for use by the evaluation means of the individual artificially intelligence entity.

The figure depicts sense information in environment 100, where a plurality of senses 55 represent various properties of environment 100. Sense 55, a variable, takes a sense value 295. Sense statements 50 are simply defined as what can be built from senses 55, their sense values 295, a collection of operators, and scalar constants 54.

As sense 55 takes sense value 295, so sense statement 50 takes a sense statement value 296. Further, as shown in FIG. 2, we can see that sense 55 with sense value 295 constitutes the most fundamental of sense statements 50, where sense statement value 296 is simply the same as sense value 295. We call this fundamental sense statement a simple sense statement 51.

Golem 20 uses the plurality of simple sense statements 51 as they exist in environment 100 to construct the set of sense statements 50 which it is able to understand. A sense statement 50 can be either simple sense statement 51 or a complex sense statement 52, which is derived from other sense statements 50 (either simple or complex) through use of some type of operator. FIG. 2 shows the three processing options which can be performed on simple sense statements 51 from environment 100, namely: (1) passing simple sense statement 51 through unaltered; (2) generating complex sense statement 52 by relating sense statement value 296 of sense statement 50 to constant 54 by means of a logical operator; or (3) generating complex sense statement 52 by relating two sense statements 50 by means of an arithmetic operator. It is important to note that complex sense statements 52 can be generated from sense statements 50 in general, either simple, complex, or both.

FIG. 2 shows as end results three sense statements 50, two complex and one simple, each with associated sense statement value 296.

This figure can be further explained by a simple example taken from a war game. Suppose sense 55 of "there is a soldier next to me", with sense value 295 of "1", indicating a soldier is indeed next to me; and another sense 55 of "there is a soldier in front of me", with sense value 295 of "0", indicating no soldier is in front of me. These senses 55 and their sense values 295 in environment 100 make up two simple statements 51.

From these two statements, we can obtain the following sense statements 50 (some simple, others complex):

(1) We can pass the simple statements 51 through unaltered, resulting in:
   Statement 1: "There is a soldier next to me." Sense Statement Value: 1
   Statement 2: "There is a soldier in front of me." Sense Statement Value: 0.
(2) We can generate complex sense statements 52 by relating sense statement values 296 of sense statements 50 (either simple or complex) to constant(s) 54 by means of logical operators, perhaps resulting in:
   Statement 3: "Statement 1 >=0." Sense Statement Value: 1 (true).
   Statement 4: "Statement 3 <>1." Sense Statement Value: 0 (false).
(3) We can generate complex sense statements 52 by relating sense statements 50 (either simple or complex) by means of arithmetic operators, perhaps resulting in:
   Statement 5: "Statement 2 AND Statement 4." Sense Statement Value: 0 (false).

Golem 20 performs statement process 40, as described in FIG. 2, whenever it looks for input.

Figure 3:
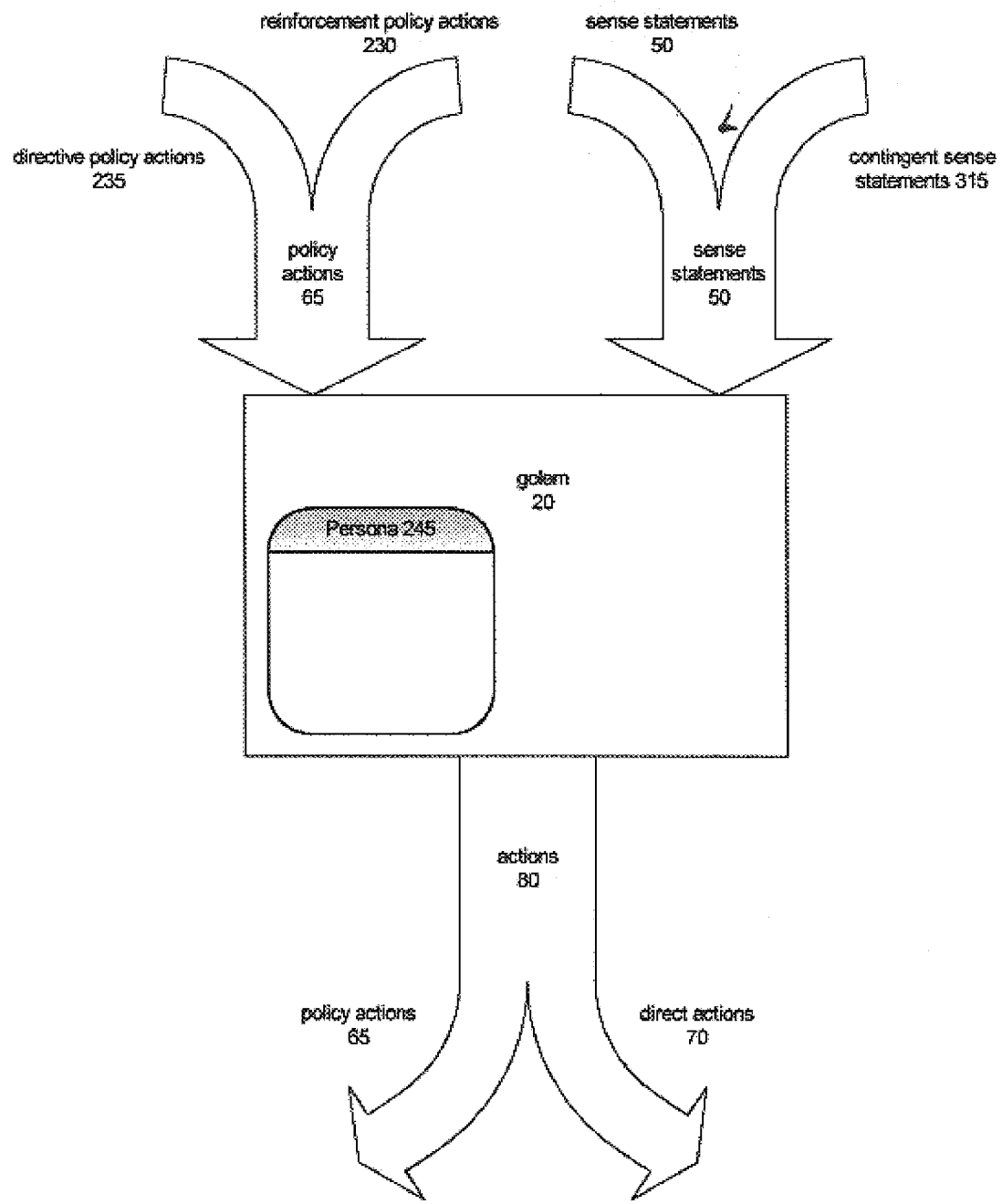
FIG. 3 shows the golem, with its inputs and outputs.

FIG. 3: Golem. with Inputs and Outputs

FIG. 3 is a block diagram showing the structure of golem 20, specifically as to its inputs and outputs. As shown, golem 20 has a persona 245, which is described more fully in FIG. 4A.

Golem 20 receives two basic types of input: (1) policy actions 65 and (2) sense statements 50.

Policy actions 65 are issued by golem 20's superior. Policy action 65 can be either (a) a directive policy action 235 or (b) a reinforcement policy action 230. Each directive policy action 235 consists of activating one of golem 20's possible policies (66, in FIG. 4A), and deactivating all of golem 20's other policies 66 of the same policy type (140, in FIG. 5B). (The structural relationship of policies 66 to policy type 140 is depicted in FIG. 5B.) Each reinforcement policy action 230 updates golem 20's set of decision-making weights in response to the success of golem 20's prior actions 80, as evaluated by golem 20's superior.

Through directive policy action 235, golem 20 is able to fulfill the function of accepting policy instructions. More specifically, the capacity to designate superior golem 15 and subordinate golem 30, with superior golem 15 performing directive policy action 235, fulfills the function of issuance of policy instructions by a superior modular artificial intelligence learning entity for a subordinate modular artificial intelligence leaning entity, and of transforming actions of golem 20 into policies for other individual artificially intelligent entities.

Sense statements 50 are derived by golem 20, through statement process 40 (described more fully in FIG. 2), from the simple sense information existing as scalar values in environment 100. Following statement process 40, sense statement 50 itself holds a scalar value. This scalar value may reflect the state of the world contingent upon golem 20 taking some action 80; In this case, we refer to sense statement 50 more specifically as a contingent sense statement 315.

For outputs, the golem issues actions 80, either directly upon environment 100 in the form of direct actions 70, or to one or a plurality of the golem's subordinate golems 30, in the form of policy actions 65, or to itself. It may be noted that policy actions 65 issued by golem 20 as output will serve as input to some entity which is subordinate to this one; similarly, the results within environment 100 of direct actions 70 taken by golem 20 as output will serve as input to other entities as reflected in sense statements 50.

The appearance of results in environment 100, feeding statement process 40, enables golem 20 to fulfill the function of implementing actions 80.

Figure 4A:
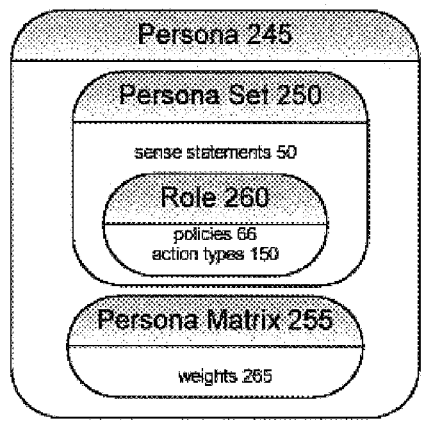
FIG. 4A shows the structure and components of the golem's persona and role.

FIG. 4A: Persona and Role

FIG. 4A illustrates two constructs characterizing golem 20, namely persona 245 and role 260. Golem 20 has available to it a set of policies and action types, and the golem's role 260 is this set.

Thus golem 20's role 260 is characterized by the list of policies 66 and action types 150 available to golem 20. As FIG. 4A shows, golem 20's role 260, along with sense statements 50 available to golem 20, together constitute golem 20's persona set 250.

A companion to golem 20's persona set 250 is its persona matrix 255. A persona matrix 255 is a set of weights 265, one weight 265 corresponding to each unique combination of sense statement 50, policy 66, and action type 150 in golem 20's persona set 250. Together, golem 20's persona set 250 and persona matrix 255 constitute its persona 245.

We can characterize golem 20's persona 245 as its individualized representation of role 260 which it may share with others. Golem 20 may share role 260 with some other golem, but golem 20, because of its own set of sense statements 50 and weights 265, will represent its role 260 differently than would a golem with non-identical sense statements 50 or weights 265.

The structure of role and persona enable several functions. First, the definition of policies and action types for golem 20 fulfills the function of assigning to each modular artificial intelligence learning entity a collection of policies and a collection of action types. Further, defining golem 20's role 260 as precisely this set fulfills the function of assigning a unique role to each unique collection of policies and action types, whereby modular artificial intelligence learning entities having different roles are role differentiated. The definition of sense statements for golem 20 fulfills the function of assigning to each modular artificial intelligence learning entity a collection of meaningful sense statements. Golem 20's persona matrix of weights 265 fulfills the function of assigning to each modular artificial intelligence learning entity a set of decision-making weights. Finally, golem 20's persona 245, comprised as it is of role 260, sense statements 50, and weights 265, fulfills the function of assigning a unique persona to each unique collection of role, sense statements, and weights. Thus the implementation of persona 245 fulfills the function of behavior differentiation among modular artificial intelligence learning entities having a same role.

The concept of the persona, enabling role differentiation of standard modular golems within the super-entity, is an important part of the invention. The division of the golem's capabilities into sense input, policy input and action output is the basis of the persona's organization.

Figure 4B:
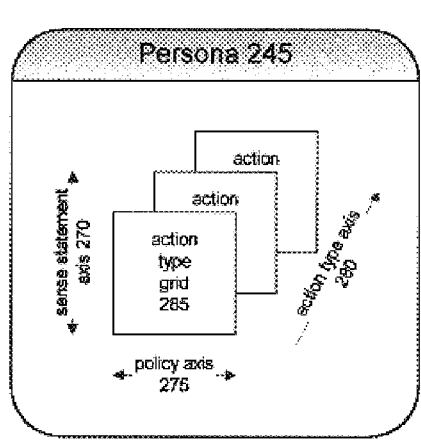
FIG. 4B shows the structure and elements of the golem's persona.
Figure 4C:
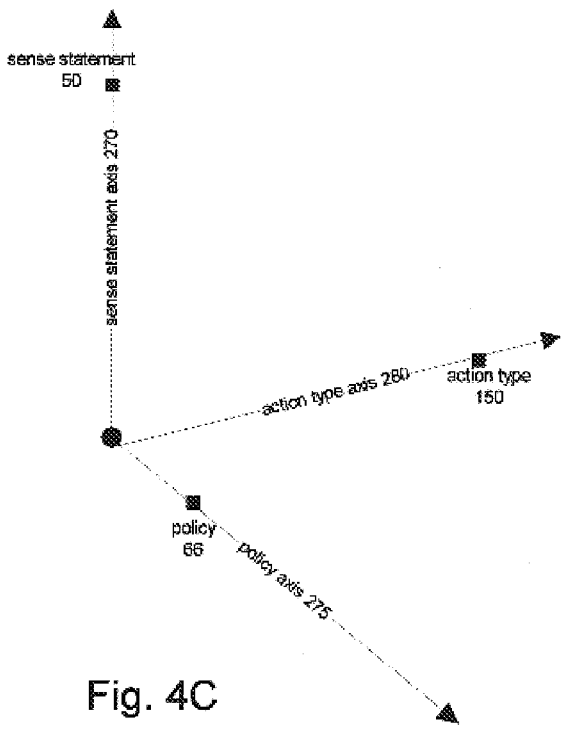
FIG. 4C shows the elements of the golem's persona set and persona matrix.

FIGS. 4B and 4C: Structure and Elements of Persona, Persona Set, and Persona Matrix FIGS. 4B and 4C detail the structural components of persona 245. The sense statements 50, policies 66, and action types 150 in persona set 250 can be modeled as unit markers on three axes, with sense statements 50 arranged along a sense statement axis 270, policies 66 along a policy axis 275, and action types 150 along an action type axis 280. This structural model has weight 265 "plotted" at each point in the three-axis space corresponding to a unique combination of sense statement 50, policy 66, and action type 150. Thus the structural framework of persona 245 fulfills the function of formally separating the evaluation means into three categories of information, comprising senses, policies, and actions.

FIG. 4B depicts another conceptual structure, an action type grid 285. This structure represents a "slice" or sheet of three-dimensional persona 245, so that action type grid 285 contains sense statement axis 270, policy axis 275, and corresponds to fixed action type 150. Weights 265 appearing on action type grid 285 correspond to unique combinations of sense statement 50 and policy 66, for fixed action type 150. Each action type 150 therefore has corresponding action type grid 285, the sum of which constitutes persona 245.

The structural model described in FIG. 4B is useful in describing how golem 20 evaluates candidate actions (120, in FIG. 5A) and eventually selects actions 80 to perform. Since each candidate action 120 is scored using an algorithm involving the components of action type grid 285, action type grid 285 is a useful construct for describing that process.

Figure 5A:
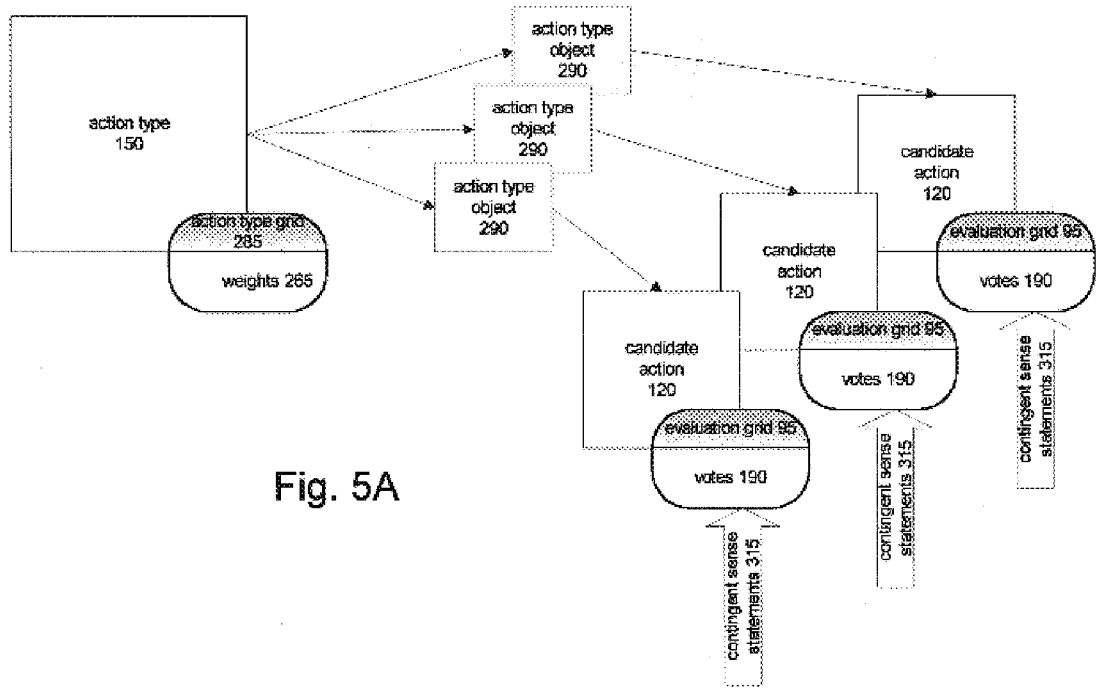
FIG. 5A shows the structure of an action type, candidate actions of that action type, and corresponding evaluation grids.
Figure 5B:
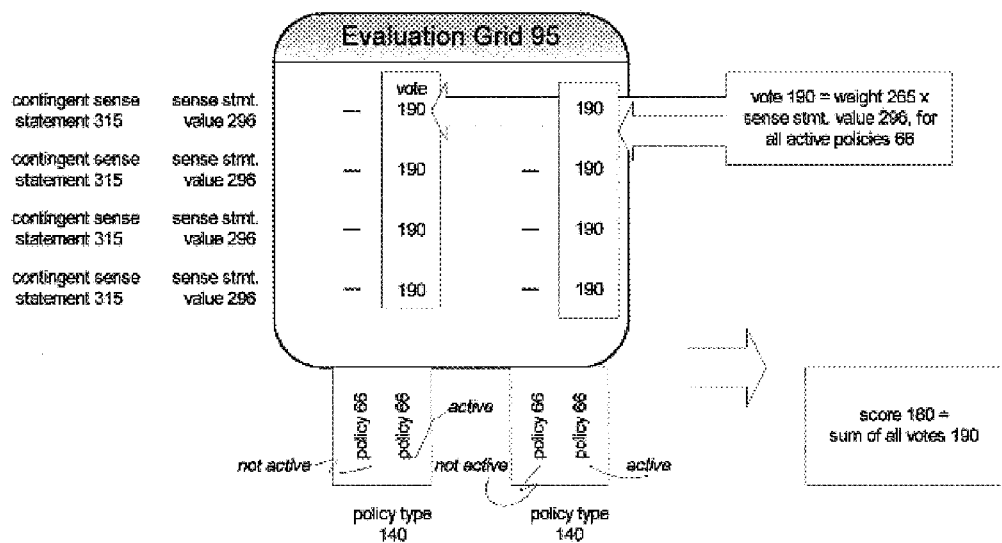
FIG. 5B shows the structure of the conceptual evaluation grid used to describe evaluation and scoring of a candidate action.

FIG. 5A: Action Type, Action Type Grid, Candidate Actions, and Evaluation Grids

FIG. 5A illustrates the relationship between a single action type 150 and the variation that arises, in the form of candidate actions 120, by presenting golem 20 with different objects on which to implement action type 150. The figure further depicts the scoring of candidate action 120 by golem 20, using the conceptual model of FIG. 4B. For example, the single action type 150 "move" can take one object, and golem 20 is given a set of appropriate objects: North, South, East, West, and nowhere. The five candidate actions 120 are move North, move South, move East, move West, and move nowhere, and golem 20 will score each of these candidate actions 120 (with the aim of furthering its active policies 66), select one action 80, and ultimately do it.

FIG. 5A considers a single action type 150 available to golem 20. Action type 150 has, as described in FIG. 4B, corresponding conceptual structure "action type grid" 285, populated with weights 265.

FIG. 5A next shows a plurality of action type objects 290. An action type object 290 is an object associated with action 80, chosen from a set of objects defined by action type 150, and representing a specific implementation of the action type. (In the above example, "move" is an action type, "North" is an action type object, and "move North" is an action.) Instances of action type 150 with different associated action type objects 290 result in different candidate actions 120 (such as "move North") of action type 150.

Each of the plurality of candidate actions 120 has an associated evaluation grid 95, which is derived from action type grid 285 and reflects contingent sense statements 315. Evaluation grid 95 has no physical reality in the code of the preferred embodiment, but is conceptual, and serves as a useful model for describing certain processes of golem 20.

FIG. 5B: Structure and Components of Evaluation Grid

The detailed view of evaluation grid 95 shows that it contains contingent sense statements 315 on one axis (each with corresponding sense statement value 296), and policies 66 on the other axis. Policies 66 have associated policy type 140, where policy type 140 is a group of policies 66 of which only one can be in effect at a time for golem 20.

The numeric entries on the grid are votes 190, where a vote 190 is the product of corresponding weight 265 and sense statement value 296 when corresponding policy 66 is active. When corresponding policy 66 is not active, vote 190 is not defined (represented on the drawing by a dashed entry). The sum of all votes 190 is score 180 of candidate action 120 corresponding to evaluation grid 95.

Figure 6:
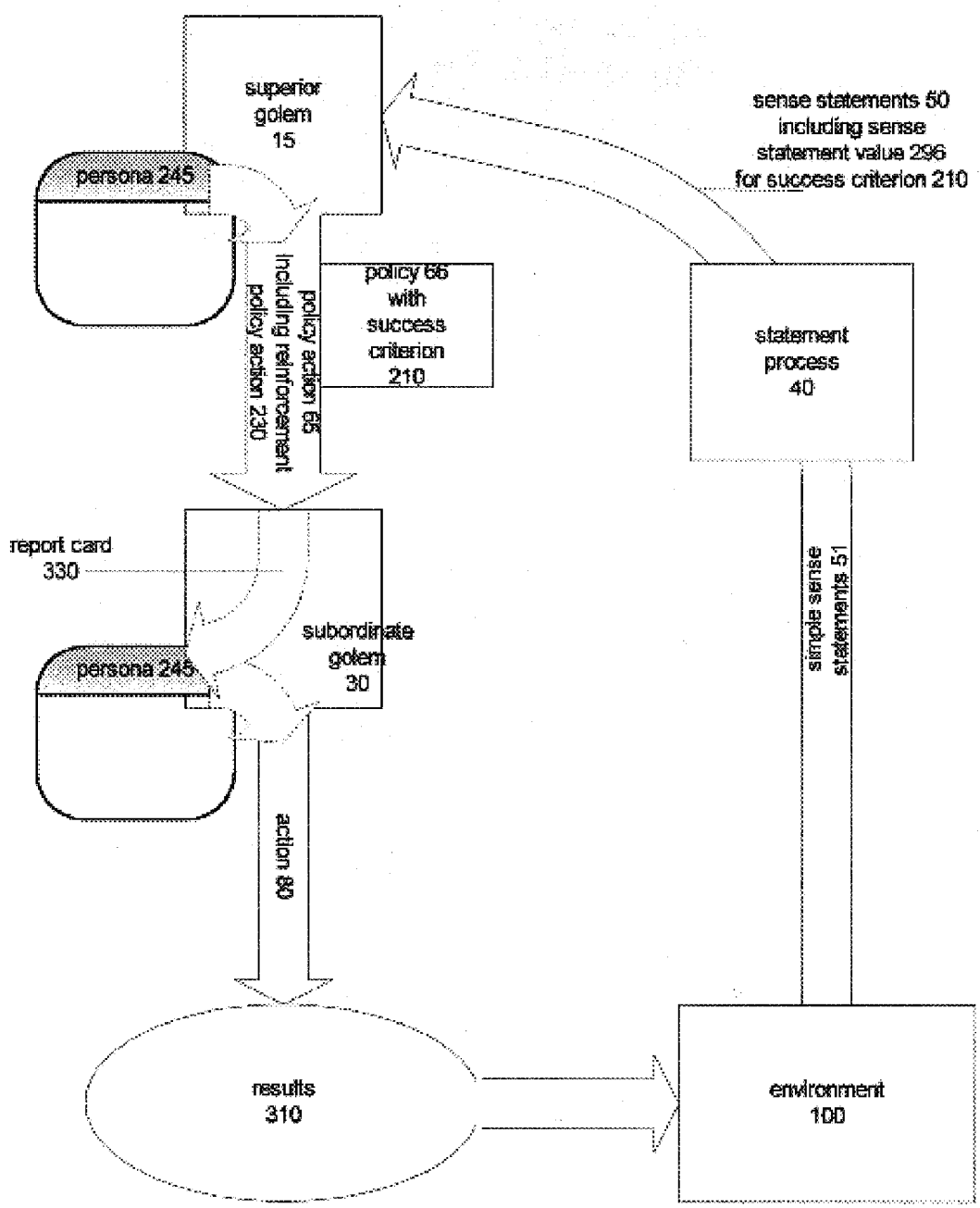
FIG. 6 shows the policy reinforcement loop amongst hierarchically organized golems, as a block diagram wherein the golems are related as superior and subordinate.

FIG. 6: Policy Reinforcement Loop amongst hierarchically organized golems

FIG. 6 is a block diagram representation of the action-driven loop between superior golem 15 and subordinate golem 30 which has as one result reinforcement policy action 230 upon subordinate golem 30.

Both superior golem 15 and subordinate golem 30, as golems 20, have personas 245. Through its persona 245, superior golem 15 chooses actions 80 and does them. (The operation of this process is illustrated in FIGS. 7–10.) In acting, superior golem 15 issues policy actions 65. As described in FIG. 3, those policy actions 65 may include directive policy actions 235, which alter which policies 66 in subordinate golem 30's persona set 250 are active. Superior golem 15's policy actions 65 may also include reinforcement policy actions 230, which reinforce (alter to reward success, per a report card 330 issued by superior golem 15) subordinate golem's persona matrix 255.

Subordinate golem 30, through its updated persona 245, now chooses actions 80 and does them. For each of subordinate golem 30's policies 66, corresponding sense statement 50, called a success criterion 210, has been defined describing successful implementation of policy 66. The results 310 of subordinate golem 30's actions exist in environment 100, where superior golem 15 sees them through sense statements 50. When superior golem 15 (back at the top of the loop) issues reinforcement policy action 230 to subordinate golem 30, sense statement value 296 of success criterion 210 appears on accompanying report card 330 and thereby supplies positive or negative reinforcement to the subordinate.

The reinforcement method described here represents an advance over prior art in that the golem's reinforcement occurs under the direction of another entity, usually another golem, and is itself driven by an AI process.

Operation of the Preferred Embodiment—FIGS. 7–13

Figure 7:
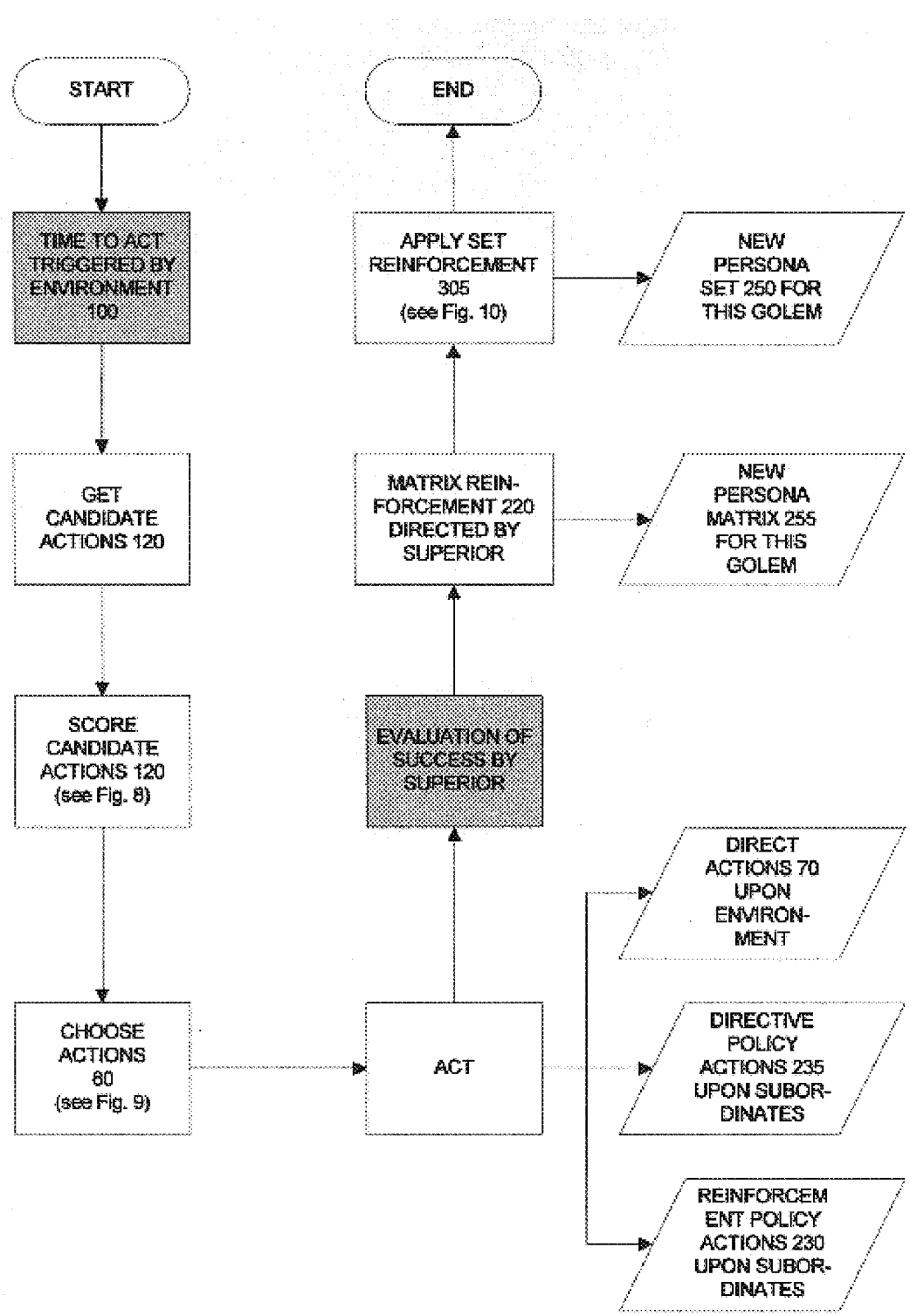
FIG. 7 shows a functional overview of a golem, as a flowchart describing the operation of the golem in the broadest sense.

FIG. 7: Functional Overview of Golem 20

FIG. 7 is a chart of the overall functional flow of golem 20. Processes within the flow that are performed outside golem 20 are shown in gray. It is important to note that the overall flow itself is initiated from outside golem 20: specifically, golem 20 is alerted that it is time to act by environment 100.

Figure 8:
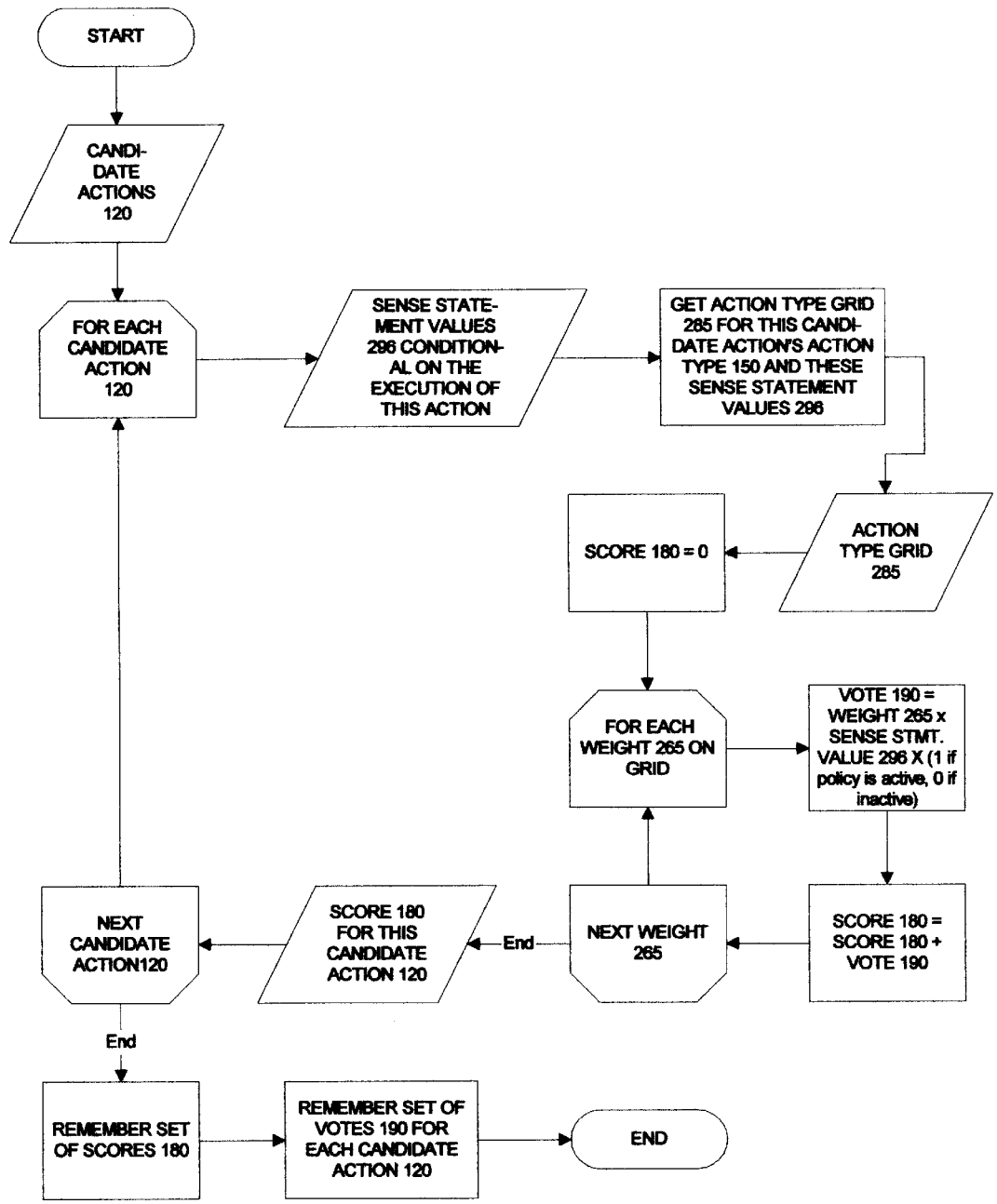
FIG. 8, a flowchart, describes the operation of the golem in scoring candidate actions.
Figure 9:
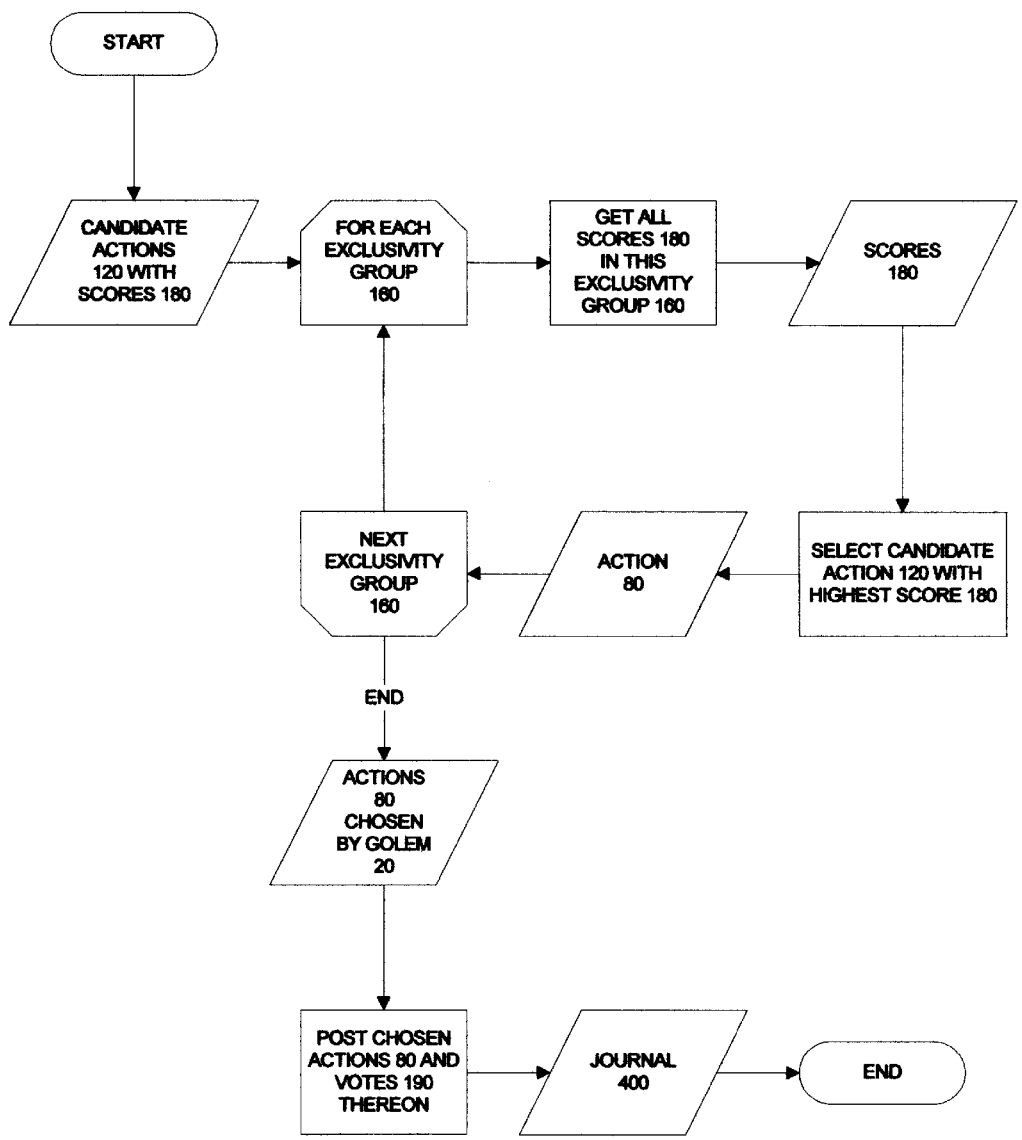
FIG. 9, a flowchart, describes the operation of the golem in choosing actions.

Golem them performs in succession the processes GET CANDIDATE ACTIONS 120, SCORE CANDIDATE ACTIONS 120, CHOOSE ACTIONS 80, and ACT. FIGS. 8 and 9 contain detailed flows for two of these processes.

The results (310, in FIG. 6) of golem 20's ACT process are threefold: (1) direct actions 70 upon environment 100; (2) directive policy actions 235 upon golem 20's subordinates; and (3) reinforcement policy actions 230 upon golem 20's subordinates. It should be noted that golem's actions 80 can consist of one or a plurality of any, a combination of, or all of these three types.

The EVALUATION OF SUCCESS process, measuring golem 20's actions 80 in furthering its policies 66, is then performed outside of golem 20 by golem 20's superior, who also directs golem 20 to perform MATRIX REINFORCEMENT 220. The matrix reinforcement process employs an algorithm that provides positive reinforcement for success and negative reinforcement for failure to weights 265 in golem 20's persona matrix 255. The algorithm is not specific to the golem which is the subject of this invention; any appropriate algorithm may be used. It is the evaluation of golem 20's success by the golem's superior, as measured by golem 20's compliance with policies 66 set by the superior, and initiation of matrix reinforcement 220 as an action upon golem 20 by its superior, that is unique to this invention and does not exist in the prior art. This innovation above prior art is possible because of the modular and hierarchically organized nature of the golems.

In a final process, golem 20 will optionally APPLY SET REINFORCEMENT 305 (more fully described in FIG. 10), resulting in new persona set 250 for golem 20.

The GET CANDIDATE ACTIONS 120, SCORE CANDIDATE ACTIONS 120, CHOOSE ACTIONS 80, and ACT processes together fulfill the function of individual artificially intelligent entity evaluating and making decisions. The EVALUATION OF SUCCESS process, use of reinforcement algorithm, and MATRIX REINFORCEMENT PROCESS together fulfill the functions of (1) evaluation of success and reinforcement of the algorithmic artificial intelligence process of a subordinate modular artificial intelligence entity by a superior modular artificial intelligence learning entity, (2) determining success of a subordinate entity's actions in complying with policies set by an individual artificially intelligent entity, and (3) determining success through receipt of reinforcement directives from superior entities. The APPLY SET REINFORCEMENT process fulfills the function of enabling the policies of an individual artificially intelligent entity to comply with reinforcement directives set by other individual artificially intelligent entities.

It should be noted that once triggered by environment 100 to act, golem 20 will always get candidate actions 120, score them, choose action or actions 80, and act. While the sequence for any given action 80 is required, multiple evaluation processes can occur in parallel; nor are actions 80 limited to any combination or quantity of direct actions 70, directive policy actions 235, or reinforcement policy actions 230.

Similarly, the invention is not limited to a one-to-one enactment of the processes for evaluation of success, matrix reinforcement 220, or set reinforcement 305 following every set of actions 80. Each of these three final processes can occur with every iteration of the functional flow in FIG. 7, or on an occasional, batch-type basis, and the invention should not be construed as limited in any of these ways.

FIG. 8: Score Candidate Actions

FIG. 8 is a detailed flow of the SCORE CANDIDATE ACTIONS 120 process appearing in FIG. 7. The flow begins with the set of candidate actions 120 available to golem 20. As described in FIG. 5A, golem 20 has a set of action types 150 available to it, and instances of those action types 150 taking particular action type objects 290 constitute candidate actions 120 available to golem 20 at this time.

FIG. 8 next shows a loop through candidate actions 120. For each candidate action 120, we input sense statement values 296 conditional on the execution of this action, and access action type grid 285 for action type 150 of candidate action 120. Note that this process applies to action type grid 285 sense statement values 296 conditional on the execution of candidate action 120. Score 180 is set to zero, and a nested loop through weights 265 on action type grid 285 begins.

For each weight 265 on action type grid 285, we set vote 190 equal to weight 265 multiplied by corresponding sense statement value 296, multiplied by a value of 1 if corresponding policy 66 is active or 0 if inactive. We then increase score 180 by vote 190.

At the end of the loop through weights 265, the result is score 180 for the candidate action 120.

At the end of the loop through candidate actions 120, we store the set of scores 180 and the set of all votes 190 for each candidate action 120, whereupon the flow ends.

FIG. 9: Choose Actions

FIG. 9 is a detailed flow of the CHOOSE ACTIONS 80 process appearing in FIG. 7.

The flow begins with a product of the prior flow (FIG. 8), specifically the set of candidate actions 120 with scores 180 available to golem 20.

A loop through exclusivity groups 160 begins. An exclusivity group 160 is a group of actions 80 of which only one may be implemented at a time; each candidate action 120 bears exclusivity group 160 assignments inherited from its action type 150.

For each exclusivity group 160, we first access all scores 180 in exclusivity group 160, then select candidate action 120 corresponding to the highest score 180.

At the end of the loop through exclusivity groups 160, the result is a set of actions 80 chosen by golem 20 for itself to carry out.

We then post the chosen actions 80, and all votes 190 submitted for each of them, to journal 400. Journal 400 may use any appropriate form of data storage. Journal 400 will be used as a data source in the MATRIX REINFORCEMENT 220 algorithm (see FIG. 7). The flow then ends.

Figure 10:
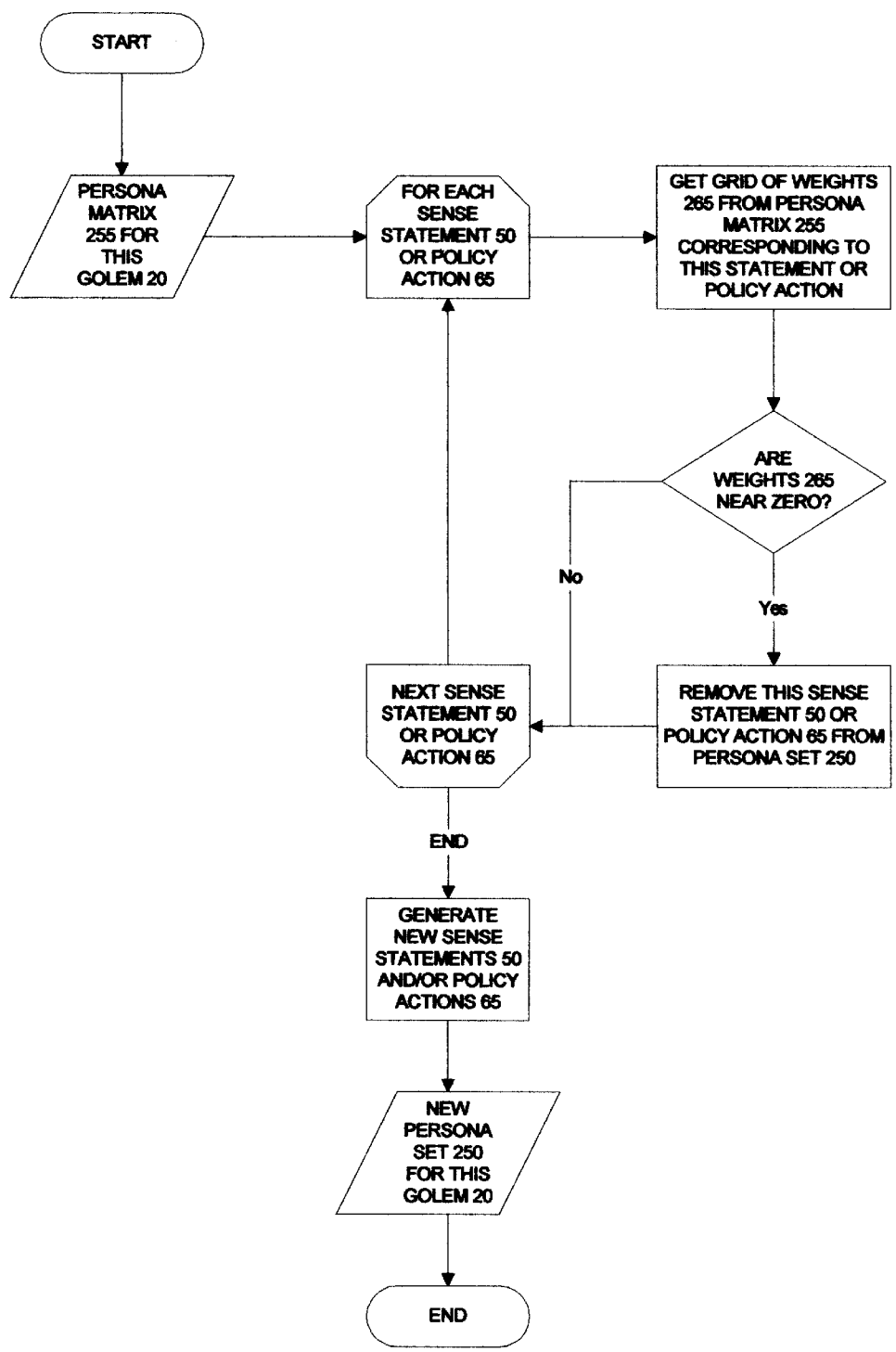
FIG. 10, a flowchart, describes the operation of the golem in applying set reinforcement.

FIG. 10: Apply Set Reinforcement 305

FIG. 10 is a detailed flow of the APPLY SET REINFORCEMENT 305 process appearing in FIG. 7. As noted in the description of FIG. 7, APPLY SET REINFORCEMENT need not happen once for each iteration of the overall functional flow shown in FIG. 7, and the invention should not be construed has having such a limitation.

APPLY SET REINFORCEMENT is an action issued by golem 20 to itself. The flow begins with persona matrix 255 for golem 20, and immediately begins a loop through sense statements 50 and/or policy actions 65.

It should be noted that set reinforcement 305 can be done with respect to sense statements 50, policy actions 65, or both, in golem 20's persona set 250.

For each sense statement 50 or policy action 65, we access the grid of weights 265 from golem 20's persona matrix 255 corresponding to sense statement 50 or policy action 65. If weights 265 are near zero (the tolerance is not specific to the invention), we remove sense statement 50 or policy action 65 from persona set 250.

At the end of the loop through sense statements 50 or policy actions 65 (or both), the result is a possibly diminished persona set 250. At this point, we may, if desired, generate new sense statements 50 and/or policy actions 65 for inclusion in persona set 250. (See FIG. 2 for a description of the sense statement generation process.) In this manner, set reinforcement 305 fulfills the function of introducing new sense statements and policies to the modular artificial intelligence learning entities. The final result of the flow is new persona set 250 for golem 20, whereupon the flow ends.

The concept of set reinforcement extends the learning behavior of the golem beyond simple reinforcement of a fixed set of evaluators. Elimination of ineffective statements and their replacement with new candidate items establishes 'concept learning' as opposed to 'training' and is an important part of the invention.

FIGS. 11(A–D): Illustration of the Evaluation Process

FIGS. 11(A–D) illustrate the action of the evaluation process in the case of the second baseman. Recall that runners are at first and third bases and the ball is hit to the second baseman. In this simplified example, only two policies are recognized: (a) choke off the run and (b) get the double play. In this case the manager has previously selected policy (a).

Similarly, only one action type 150 is used in this simple example: Throw the ball. Potential objects are first, second and third bases and home plate. The 'throw' action generates these four candidate actions 120, and action type grid 285 for 'throw' is to be used on each. Consider the four statements. S1, 'Ball goes to base where runner is approaching' could be a simple statement 51: 'Runner approaches the base, object of this action' with potential values 1 (true) and 0 (false). S2, 'Chance at double play' would be a complex statement 52, perhaps of the form 'S1 and object base is Second and runner approaches First'. S3, 'Chance to prevent run' would also be a complex statement 52, perhaps 'S1 and object base is Home'. S4 is some other sense statement 50.

The contingent sense statement 315 values are the values these statements would take if the given action were performed. Thus their values vary with the object of the candidate action: S1 is 1 for first, second and home but 0 for third and so on.

The contingent statement values, applied to weights 265 for policy Choke in the action type grid, result in votes 190; these votes, summed, give scores 180 for each of the candidate actions under the selected policy. The highest scoring candidate action is 'throw to home' and this is the action selected.

Independently of the selection process, journal 400 records the votes and the results of action selection. Later, in the reinforcement process, votes for successful actions and against unsuccessful actions will lead to adjustments in their corresponding weights 265. Intuitively, we can say that 'throw to home' was a proper decision at this point and that the weights (S1, S2, S3) supporting that decision would be increased. S4 would have its weight decreased in absolute value as a result of 'voting wrong'.

After a period of reinforcement, statements will be evaluated for their actual contributions to decisions, i.e. their weights. S4, for instance, might vote right and wrong randomly, have its weights reduced to near zero and be eliminated from this player's persona 245.

ADVANTAGES

The golem which is the subject of the invention incorporates a structure not seen in prior art, wherein the AI learning entity is modular but role-differentiated, so that a single entity is replicated many times to form a super-entity that shows intelligent behavior transcending that of its individual constituents.

The advantages of this scheme include its unlimited extensibility, both horizontal (more entities at the same level) and vertical (more deeply nested hierarchies) using the same golem with only changes in personas. The scheme is well adapted to working over a network with logically separated but communicating golems. Its flexibility allows its application both to single complex problems and to repetitively occurring simple problems. Opportunities for its use arise in operating environments, in simulation and gaming, and in research.

CONCLUSION, RAMIFICATIONS, AND SCOPE

While the above description of the invention contains many specificities, these should not be construed as limitations on the scope of the invention, but rather as an exemplification of one preferred embodiment thereof. The heart of the invention is the hierarchically organized set of role-differentiated golems, in which each golem receives sense input from the outside world and policy input from other (superior) golems and produces policy output, including reinforcement, sent to other (subordinate) golems. Within this framework numerous variations are possible, including, but not limited to, the following:

Different algorithms can be used to apply actual reinforcement (matrix reinforcement 220 and set reinforcement 305, in FIGS. 7 and 10).

Different senses 55 can be made available from environment 100 (refer to FIG. 2). Sense values 295 can be obtained from other computer programs (extracts, simulations, games), from electronic or mechanical devices, from human beings directly, or as parameters associated with policies set by other entities including other golems.

Different logical operators can be used in the construction of complex sense statements 52 (refer to FIG. 2).

Within the constraints of the environment 100 within which the super-entity 110 exists, possible policies 66 and action types 150 can be added or changed (i.e., personas 245 added or changed) without vitiating the accumulated learning of other golems 20 (refer to FIG. 4A).

The set of golems can operate by itself or in cooperation with other AI entities or with human beings.

The set of golems can be collocated or spread out in a physical network.

Accordingly, the scope of the invention should be determined not by the embodiment(s) illustrated, but by the appended claims and their legal equivalents.

I claim:

1. An artificial intelligence system for creating actual multi-entity situations and solving complex problems, comprising:
  (a) a computer apparatus comprising:
    (i) interface means of accepting computer-readable data input,
    (ii) memory means for storing computer-readable data;
    (iii) processor means for manipulating computer-readable data; and
    (iv) interface means for communicating computer-readable data output,
  (b) a plurality of modular artificial intelligence learning entities, similar in structure, each comprising:
    (i) means of accepting sense data,
    (ii) means of accepting policy instructions,
    (iii) algorithmic artificial intelligence means of evaluating and making decisions, and
    (iv) means of implementing actions; and
  (c) a means of hierarchically arranging said modular artificial intelligence learning entities into superior-subordinate relationships, each of said superior-subordinate relationships comprising:
    (i) a means for issuance of policy instructions by said superior modular artificial intelligence learning entity for said subordinate modular artificial intelligence learning entity, and
    (ii) a means for evaluation of success and reinforcement of the algorithmic artificial intelligence process of said subordinate modular artificial intelligence learning entity by said superior modular artificial intelligence learning entity.

2. The artificial intelligence system of claim 1, wherein the hierarchical arrangement of said modular artificial intelligence learning entities is at any moment organized in a superior-subordinate form, and these superior-subordinate relationships may be changed by policy as time passes.

3. The artificial intelligence system of claim 1, further including at least one foreign artificially-intelligent entity.

4. The artificial intelligence system of claim 3, further including a means whereby each of said foreign artificially-intelligent entities can interface with said modular artificial intelligence learning entities.

5. The artificial intelligence system of claim 1, further including at least one human being.

6. The artificial intelligence system of claim 5, further including a means whereby each of said human beings can interface with said modular artificial intelligence learning entities.

7. The artificial intelligence system of claim 1, further including a means of role differentiation of said modular artificial intelligence learning entities, comprising:
   (a) a means for assigning to each modular artificial intelligence learning entity a collection of policies,
   (b) a means for assigning to each modular artificial intelligence learning entity a collection of action types, and
   (c) a means for assigning a unique role to each unique collection of policies and action types,
whereby said modular artificial intelligence learning entities having different roles are role differentiated.

8. The artificial intelligence system of claim 7, further including a means of behavior differentiation among said modular artificial intelligence learning entities having a same role, comprising:
   (a) a means for assigning to each modular artificial intelligence learning entity a collection of meaningful sense statements,
   (b) a means for assigning to each modular artificial intelligence learning entity a set of decision-making weights, and
   (c) a means for assigning a unique persona to each unique collection of role, sense statements, and weights;
whereby two of said modular artificial intelligence learning entities having identical roles and different weights or collections of sense statements thereby exhibit variation of behavior.

9. The artificial intelligence system of claim 8, further including a means for introducing new sense statements and policies to said modular artificial intelligence learning entities.

10. An individual artificially intelligent entity, comprising:
   (a) A means for evaluating and making decisions,
   (b) A means for formally separating the evaluation means into three categories of information, comprising:
      (i) senses,
      (ii) policies, and
      (iii) actions,
   (c) A means for transforming said actions into policies for other individual artificially intelligent entities,
   (d) A means for enabling said policies of said individual artificially intelligent entity to comply with reinforcement directives set by other individual artificially intelligent entities, and
   (e) A means for defining said artificially intelligent entity as superior to subordinate entities selected from the group consisting of foreign artificially intelligent entities, foreign non-intelligent entities, human beings, and other instances of the individual artificially intelligent entity.

11. The individual artificially intelligent entity of claim 10, further including a means for organizing said senses into sense statements.

12. The individual artificially intelligent entity of claim 11, wherein said means for organizing senses into sense statements includes a means for building complex statements from combinations of said sense statements.

13. The individual artificially intelligent entity of claim 12, further including a means for generating additional complex statements for use by said evaluation means of said individual artificially intelligence entity.

14. The individual artificially intelligent entity of claim 10, further including a means for determining success of said subordinate entity's actions in complying with policies set by said individual artificially intelligent entity.

15. The individual artificially intelligent entity of claim 14, wherein said means for determining success is receipt of said reinforcement directives from said superior entities.

16. The individual artificially intelligent entity of claim 14, wherein the actions of said individual artificially intelligent entity are transformed into a policy for said subordinate entities directing compliance with a reinforcement directive.

* * * * *